United States Patent Office 3,405,164
Patented Oct. 8, 1968

3,405,164
2,5-DIACYLAMINO-3,6-DIAMINO-1,4-
DIHYDROXYBENZENES
Erhardt Winkelmann, Kelkheim, Taunus, and Wolf-Helmut Wagner, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 18, 1964, Ser. No. 368,337
Claims priority, application Germany, May 25, 1963, F 39,839
4 Claims. (Cl. 260—471)

ABSTRACT OF THE DISCLOSURE 2,5-di-lower acylamino and 2,5-di-carbo-lower alkoxyamino-3,6-diamino-1,4-dihydroxybenzene compounds and the acid addition salts thereof with physiologically tolerable inorganic and organic acids which are active against poultry coccidiosis.

The present invention relates to 2,5-diacylamino-3,6-diamino-1,4-dihydroxybenzenes and to a process for preparing them. It, moreover, relates to medicaments and animal food which contain the afore-mentioned substances as active ingredients and which are active against poultry coccidiosis.

We have found that 2,5-diacylamino-3,6-diamino-1,4-dihydroxybenzenes of the general Formula I

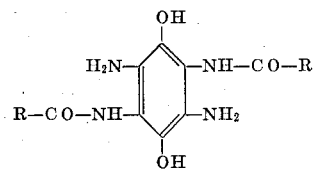

in which R represents an alkyl or alkoxy radical having from 1 to 4 carbon atoms, and the addition salts thereof with physiologically tolerable acids, can be obtained by reducing 2,5-diacylamino-3,6-diamino-1,4-benzoquinones of the Formula II

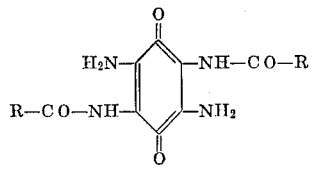

in which R has the meaning given above, and by converting, if desired, the compounds obtained into the corresponding salts by the addition of physiologically tolerable acids.

According to the process of the present invention, a reducing agent is caused to act on the corresponding 2,5-diacylamino-3,6-diamino-1,4-benzoquinones. As reducing agents there can be used for example, catalytically activated hydrogen, tin (II) chloride or alkali metal dithionites. The catalytic hydrogenation of the quinones is advantageously carried out in the presence of a solvent in which the starting or final product dissolves at least partially. Suitable are for example dioxane, tetrahydrofurane and glycolmonomethyl ether. As catalysts there may be used finely dispersed nickel, for example Raney-nickel, cobalt or noble metals of the eighth group of the Periodic System, preferably palladium and platinum. The working-up is advantageously carried out with the exclusion of air, since the hydroquinone compounds obtained oxidize easily when being dissolved.

The reduction with tin (II) chloride is performed in concentrated hydrochloric acid at temperatures in the range of 20–50° C. The hydroquinones formed crystallize in most cases directly from the reaction solution in the form of tin double salts, from which the free bases can be obtained according to known methods, for example by a treatment with hydrogen sulfide. It is of particular advantage to perform the reduction with alkali metal dithionites. In this case a corresponding 2,5-diacylamino-3,6-diamino-1,4-benzoquinone is suspended in an aqueous solution of sodium dithionite. The alkali metal dithionite is used in an equimolar quantity or advantageously in an excess of up to 100%. The concentration of the reducing agent amounts to 1–50%, advantageously to 10–20%. The reduction takes place at temperatures in the range of 0–100° C., preferably in the range of 20–90° C. The reaction period lasts from some minutes to several hours and depends on the chemical and physical structure of the quinone used and on the reaction temperature.

The end of the reduction is accompanied by the color change of the suspension from dark brown to white or light grey, or light brown. The products obtained are filtered, washed with water and alcohol and finally dried.

As starting substances for the process of the present invention those 2,5-diacylamino - 3,6 - diamino-1,4-benzoquinones are particularly suitable in which the substituent R represents the methyl, ethyl, propyl, isopropyl, butyl and isobutyl group or the methoxy, ethoxy, propoxy, isopropoxy, butoxy and isobutoxy radical.

The starting substances are obtained by causing carboxylic acid anhydrides, carboxylic acid halides, particularly chlorides or chloroformic acid alkyl esters to act on 2,3,5,6-tetramino-1,4-benzoquinone. For this reaction anhydrides or halides, particularly chlorides of acetic acid, propionic acid, butyric acid, isobutyric acid, valeric acid and isovaleric acid or the chloroformic acid methyl esters, chloroformic acid ethyl esters, chloroformic acid propyl esters, chloroformic acid isopropyl esters, chloroformic acid butyl esters and chloroformic acid isobutyl esters can be used. The 2,3,5,6-tetramino-1,4-benzoquinone serving as starting substance for the aforementioned reaction can be prepared by the process described in U.S. Patent No. 3,051,725 by the reaction of chloranil with potassium phthalimide and subsequent hydrazinolysis of the 2,3,5,6-tetraphthalimido-1,4-benzoquinone.

As physiologically tolerable inorganic or organic acids there may be mentioned for example, hydrohalic acids, particularly hydrochloric acid, sulfuric acid, phosphoric acid and amidosulfonic acid.

In their pure form the products of the present invention are stable colorless to light grey powders. They are valuable medicaments which are particularly suitable for the prophylaxis and therapy of poultry coccidiosis.

The following test demonstrates the efficiency of the new compounds: Ten chickens each were treated in one group. The infection with 50,000–100,000 oocysts of *Eimeria tenella* was performed by means of the esophageal sound in such a way that 90–100% of the infected non-treated control animals died in each test. Starting with the day of infection, the animals were treated on 7 successive days with 0.03 g./kg. of body weight of 2,5-dipropionylamino-3,6-diamino - 1,4 - dihydroxybenzene or 0.01 g./kg. of body weight of 2,5-dicarbomethoxyamino-3,6-diamino-1,4-dihydroxybenzene. Under these conditions all treated animals survived and showed a normal increase in weight. In the autopsy at the end of the test, practically no oocysts could be detected in the cecum.

For the prophylaxis and therapy of coccidiosis the substances are advantageouly mixed with a solid, inert and well tolerable mass in which they are homogeneously distributed. The active substances are preferably admixed with the food. In order to attain a uniform distribution it is useful to prepare first a preliminary mixture in which the active substances are concentrated. In practice, concentrations of 10 to 50% preferably of about 25%, are used. Inorganic or organic physiologically tolerable substances may be used as carriers, for example, calcium carbonate, flour of various types of grain or dry mycelium of the fermentation of antibiotics. It is particularly advantageous to use wheat middlings for the purpose. Other substances, for instance antibiotics or vitamins, may be added to the concentrates. Such a concentrate is then mixed with the chicken or hen food so that a mixture containing the active substances in a concentration of 0.001–0.1% is attained.

Such a mixture contains for example:

| | |
|---|---|
| White-fish meal kg | 3.5 |
| Soya coarse meal kg | 9.0 |
| Barley coarse meal kg | 2.5 |
| Maise coarse meal kg | 20.75 |
| Wheat coarse meal kg | 10.0 |
| Wheat bran kg | 2.5 |
| Calcium phosphate kg | 0.5 |
| Calcium carbonate kg | 0.5 |
| Mixture of vitamins and mineral salts kg | 0.5 |
| 2,5 - dipropionylamino-3,6-diamino-1,4--dihydroxybenzene g | 15 |

The following examples serve to illustrate the invention, but they are not intended to limit it thereto:

EXAMPLE 1

(a) 2,5 - diacetylamino - 3,6 - diamino-1,4-dihydroxybenzene.—25.2 grams (0.1 mol) of 2,5-diacetylamino-3,6-diamino-1,4-benzoquinone are dissolved in 1250 cc. of concentrated hydrochloric acid, and a solution of 45.2 grams (0.2 mol) of tin (II) chloride dihydrate in 250 cc. of concentrated hydrochloric acid is added. The solution decolorizes immediately, and 2,5-diacetylamino-3,6-diamino-1,4-dihydroxybenzene-dihydrochloride precipitates as tin (II) chloride double salt. It is stirred for 1 hour at room temperature, filtered with suction, washed first with concentrated hydrochloric acid and then with absolute alcohol and ether. The tin double salt is obtained in the form of a white powder without melting point with a yield of 40 grams=78% of theory.

(b) 2,5 - diacetylamino - 3,6 - diamino-1,4-dihydroxybenzene is also formed, if 25.2 grams (0.1 mol) of 2,5-diacetylamino - 3,6 - diamino-1,4-benzoquinone are suspended in a solution of 34.8 grams (0.2 mol) of sodium dithionite in 250 cc. of water, and the mixture is stirred for 90 minutes at room temperature. It is then filtered with suction, washed with water, alcohol and ether. 2,5-diacetylamino-3,6-diamino-1,4-dihydroxybenzene is obtained with a nearly quantitative yield in the form of a white powder, it does not show a characteristic decomposition point.

The 2,5 - diacetylamino-3,6-diamino-1,4-benzoquinone used as starting substance is obtained with a yield of 90% by heating 2,3,5,6-tetramino-1,4-benzoquinone with excess acetic acid anhydride with the addition of some drops of concentrated sulfuric acid for 3 hours on the steam bath while stirring. The compound obtained is a brown powder without melting point.

$C_{10}H_{12}N_4O_4$ (molecular weight 252). Calculated: 47.6% C, 4.8% H, 22.2% N. Found: 47.3% C, 4.8% H, 21.8% N.

EXAMPLE 2

2,5 - dipropionylamino - 3,6 - diamino - 1,4 - dihydroxybenzene.—28 grams (0.1 mol) of 2,5-dipropionylamino-3,6-diamino-1,4-benzoquinone are suspended in a solution of 34.8 grams (0.2 mol) of sodium dithionite in 300 cc. of water and stirred for 30 minutes at 90° C. on the steam bath. It is filtered with suction and washed with water, alcohol and ether. 2,5-dipropionylamino-3,6-diamino-1,4-dihydroxybenzene is obtained with a nearly quantitative yield in the form of a white powder. It does not show a characteristic melting point.

The 2,5 - dipropionylamino - 3,6 - diamino-1,4-benzoquinone used as starting substance is obtained with a yield of 90% according to the method described in Example 1(b) from 2,3,5,6-tetramino-1,4-benzoquinone and propionic acid anhydride or by suspending 16.8 grams (0.1 mol) of 2,3,5,6-tetramino-1,4-benzoquinone in 300 cc. of dry pyridine, dropwise adding 18.5 grams (0.2 mol) of propionic acid chloride at 25° C. while stirring and heating for 3 hours on the steam bath. The reaction mixture is cooled, diluted with the same quantity of water, and the reaction product is filtered with suction. The compound obtained is a brown powder with a decomposition point of 314° C.

$C_{12}H_{16}N_4O_4$ (molecular weight 280). Calculated: 51.5% C, 6.0% H, 20.2% N. Found: 51.5% C, 6.0% H, 19.7% N.

EXAMPLE 3

2,5 - dicarbomethoxyamino - 3,6 - diamino - 1,4 - dihydroxybenzene.—28.4 grams (0.1 mol) of 2,5-dicarbomethoxyamino-3,6-diamino-1,4-benzoquinone are reduced as described in Example 2 with 34.8 grams (0.2 mol) of sodium dithionite in 300 cc. of water.

2,5 - dicarbomethoxyamino-3,6-diamino-1,4-dihydroxybenzene is obtained with a nearly quantitative yield in the form of a light brown powder, it does not show a characteristic decomposition point.

The 2,5-dicarbomethoxyamino-3,6-diamino-1,4-benzoquinone used as starting substance is obtained with a yield of 80%, by suspending 16.8 grams (0.1 mol) of 2,3,5,6-tetramino-1,4-benzoquinone in 200 cc. of dry quinoline and reacting it with 37.8 grams (0.4 mol) of chloroformic acid methyl ester. The reaction mixture is worked up as described in Example 2. The compound is obtained in the form of a light brown powder, it does not show a characteristic melting point.

$C_{10}H_{12}N_4O_6$ (molecular weight 284). Calculated: 42.4% C, 4.2% H, 19.7% N. Found: 42.2% C, 4.1% H, 19.7% N.

We claim:

1. 2,5-diacylamino-3,6-diamino-1,4-dihydroxybenzenes of the general formula

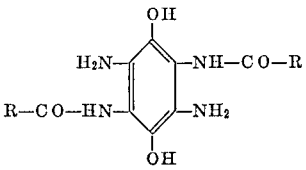

in which R is selected from alkyl and alkoxy having up to 4 carbon atoms, and the acid addition salts of said compounds with physiologically tolerable inorganic and organic acids.

2. 2,5-diacetylamino-3,6-diamino-1,4-dihydroxybenzene.

3. 2,5 - dipropionylamino - 3,6-diamino-1,4-dihydroxybenzene.

4. 2,5 - dicarbomethoxyamino - 3,6 - diamino - 1,4 - dihydroxybenzene.

References Cited

UNITED STATES PATENTS 2,802,001   8/1957   Marxer _____ 260—239

LORRAINE A. WEINBERGER, *Primary Examiner.*

L. A. THAXTON, *Assistant Examiner.*